United States Patent [19]

Strathman

[11] 4,367,633

[45] Jan. 11, 1983

[54] BATTERY AND SOLAR POWERED REFRIGERATING SYSTEM

[76] Inventor: Ronald L. Strathman, P.O. Box 6557, San Diego, Calif. 92106

[21] Appl. No.: 110,233

[22] Filed: Jan. 7, 1980

[51] Int. Cl.³ .................... F25B 27/00; F25D 23/12
[52] U.S. Cl. .................... 62/236; 62/235.1; 62/337
[58] Field of Search ............ 62/337, 236, 216, 2, 62/338, 339, 235.1; 126/429

[56] References Cited

U.S. PATENT DOCUMENTS

| | | | |
|---|---|---|---|
| 3,850,006 | 11/1974 | Redfern et al. | 62/337 |
| 3,943,726 | 3/1976 | Miller | 62/236 |
| 4,027,727 | 6/1977 | Pullens | 62/236 |
| 4,137,098 | 1/1979 | Fields | 126/429 |

Primary Examiner—Albert J. Makay
Assistant Examiner—Henry Bennett

Attorney, Agent, or Firm—Brown & Martin

[57] ABSTRACT

The system includes a container and a door therefor, each comprised of inner and outer shells made of a moisture impervious material having sealed therebetween an insulating material. A holding plate, containing a eutectic solution and a refrigerant evaporator coil, is disposed within the container. A refrigerating circuit is provided including a compressor and condenser coil connected to the evaporator coil. A control unit monitors the eutectic solution temperature and the refrigerant temperature at the compressor output. It minimizes the operating times of the compressor and condenser fan necessary to maintain preferred temperatures inside the container in order to minimize the drain on batteries which are provided for powering the same. In addition, an array of solar cells is provided and the control is adapted for powering the compressor and condenser fan with their output when it is above the predetermined minimum operating level.

2 Claims, 9 Drawing Figures

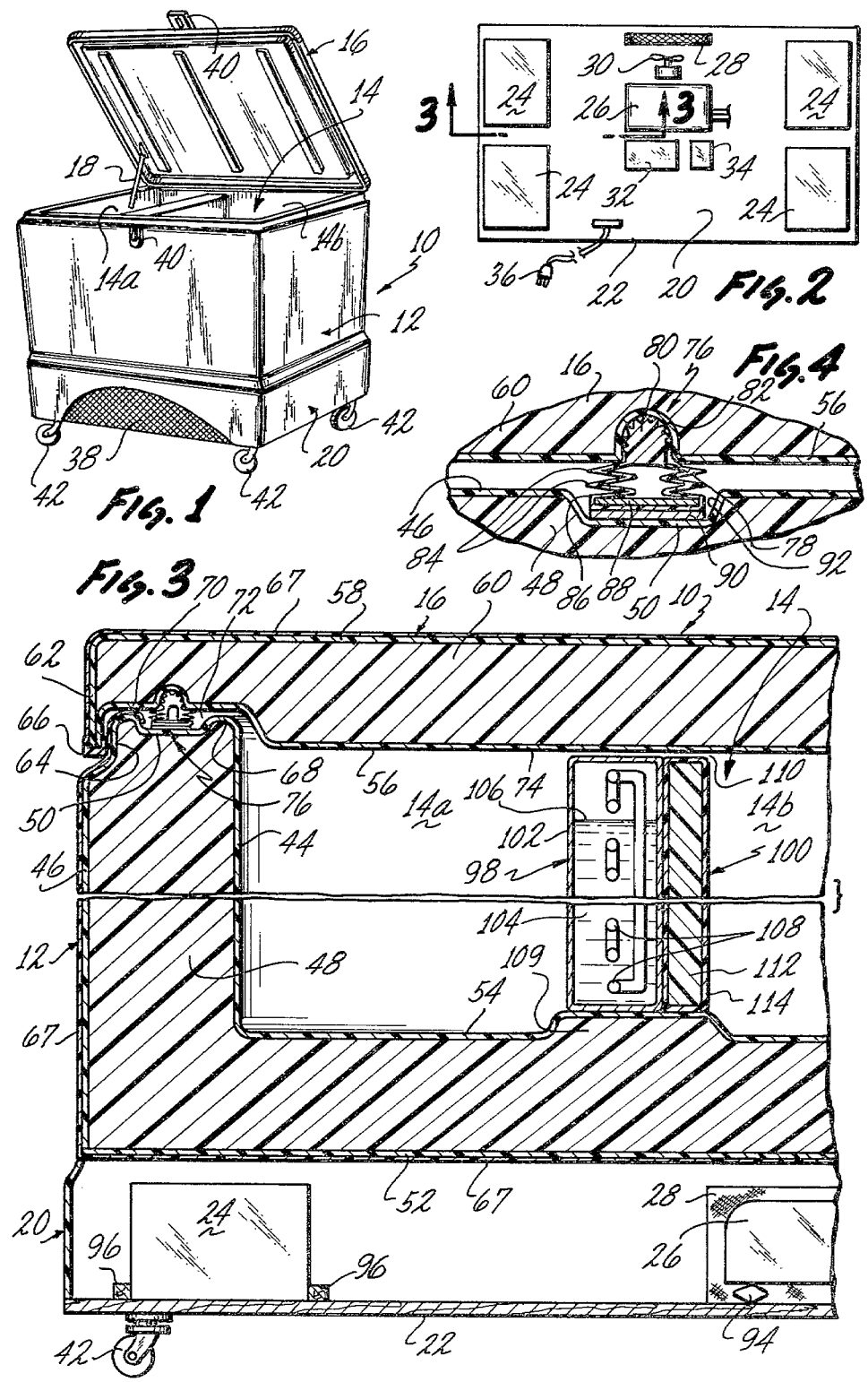

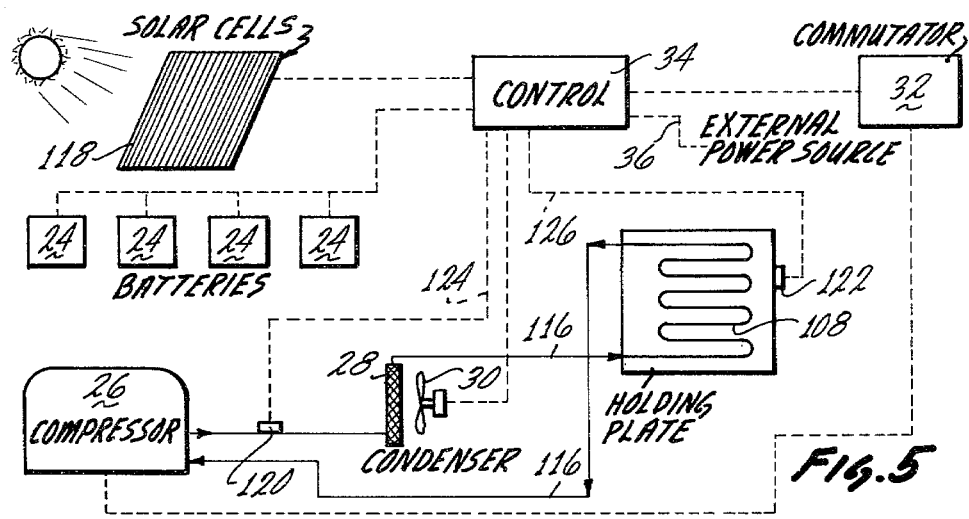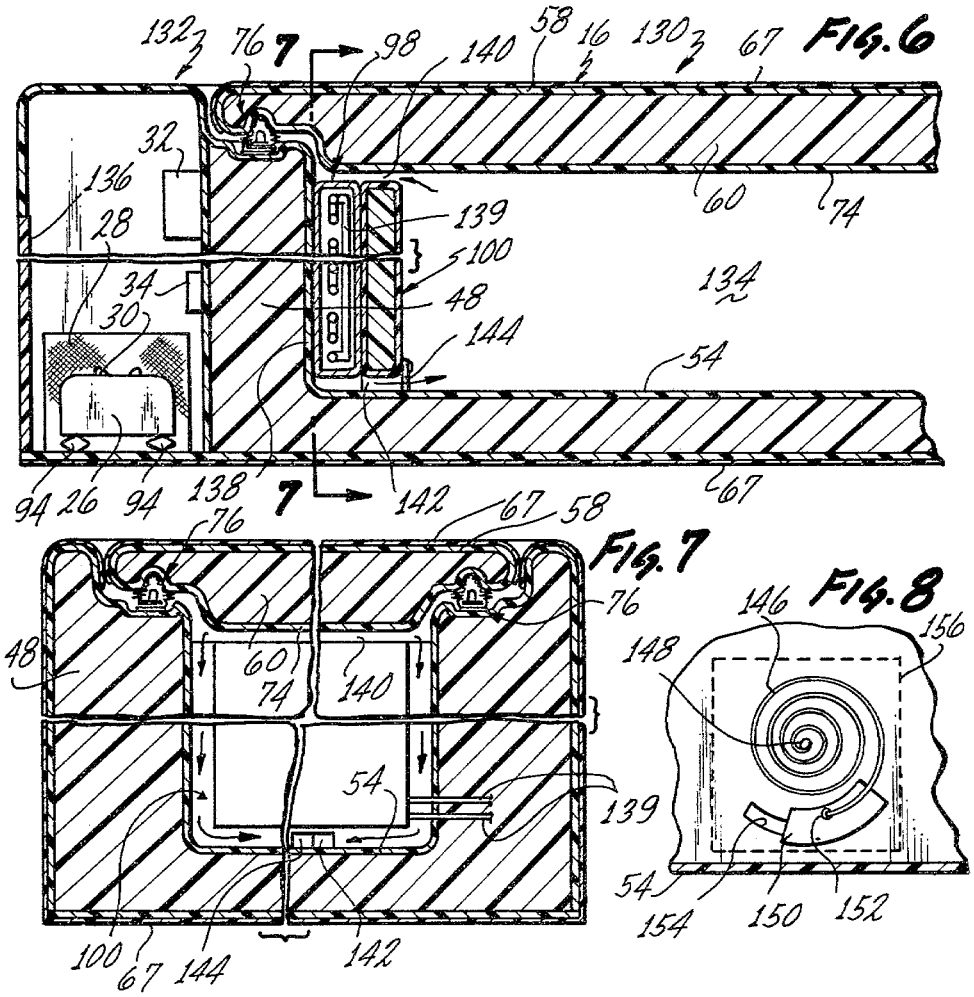

BATTERY AND SOLAR POWERED REFRIGERATING SYSTEM

BACKGROUND OF THE INVENTION

The present invention relates to refrigerators, and more particularly to a refrigerating system capable of maintaining low temperatures over long periods of time utilizing solely electrical power from solar cells and/or batteries.

Typical refrigeration systems, such as household refrigerators, cold storage systems, and refrigerated vans and railway cars have a continually available power source to maintain the refrigeration compartment at its desired reduced temperature. With such typical systems the power source is readily available and the refrigerating circuit components typically operate a high percentage of the time that the refrigeration system is in use.

Many recreational vehicles, such as power cruisers and motorized mobile homes, require refrigerating systems. These systems are typically expensive in that they must be either provided with an auxiliary power supply or run directly from the power of the vehicle. Such systems are economically feasible for large and expensive mobile homes and power cruisers. However, such systems are not typically available and suitable for the average power cruiser and/or motorized mobile home.

The rapidly accelerating population growth in third world developing and underdeveloped countries is accompanied by the increased difficulty of providing basic medical care for individuals in remote areas. Vast areas of the world do not have electric utility systems which are extensive enough so that vaccines and other perishable medical supplies can be stored and used effectively. As a result, large groups of people are denied the benefits of immunization and treatment for common diseases which have been nearly eliminated in developed countries for many years.

Conventional refrigeration systems are not suitable for maintaining reduced temperatures for any extended period of time without power input. While such systems will normally maintain a low temperature for a few hours, if power is not available very shortly thereafter, the temperature rises and food or medicine spoilage usually occurs. It is generally not possible to operate conventional refrigerators with batteries since an unduly large number of batteries would be required and they would quickly drain, due to the relatively great energy consumption of such refrigerators. In addition, conventional refrigerators are not well adapted for receiving power from solar cells since an unduly large number of such cells would be required to produce the minimum level of electric current needed to operate their compressors.

For these reasons, it is desirable that a refrigeration system be available which requires a very short duration power input and yet has a long duration cooling period between power input periods.

SUMMARY OF THE INVENTION

It is therefore the primary object of the present invention to overcome the above problems of the prior art.

Another object of the present invention is to provide a high efficiency refrigeration system capable of operating for long periods of time solely from electrical power supplied from solar cells and/or batteries.

A still further object of the present invention is to provide a refrigerating system which incorporates a control which automatically minimizes electrical power consumption.

In accordance with the present invention, efficient storage batteries, low cost photovoltaic cells, and high efficiency refrigeration construction techniques are utilized to produce a self-contained battery/solar powered freezing and refrigerating unit suitable for use in connection with recreation vehicles and suitable for use in remote areas of underdeveloped countries.

In one embodiment the system includes a container including spaced apart inner and outer plastic shells defining an upwardly opening compartment. Polyurethane foam insulation is sealed between the shells. The compartment can be opened and closed with a similarly constructed door. The exterior surfaces of the container and door are covered with an infrared radiation barrier. A magnetically sealing gasket provides an airtight seal between the door and the container.

A holding plate subdivides the compartment into a freezer portion and a cooler portion. It is filled with a eutectic solution which is repeatedly frozen by a refrigerant evaporator coil which traverses the interior of the holding plate tank in serpentine fashion. An insulating panel covers the side of the tank facing the cooler portion of the compartment so that less heat is extracted from that side. The evaporator coil is connected with a refrigerant condenser coil and refrigerant compressor mounted in a housing beneath the container. Four DC batteries, a condenser fan, and a control are also mounted in the housing. An array of solar cells are mounted on a nearby roof.

The control causes the compressor to run for the minimum amount of time necessary to freeze the eutectic solution. It further starts the compressor when the temperature of the eutectic solution rises only a few degrees above its freezing point. The control further operates the condenser fan only when there is insufficient heat exchange as a result of the thermal inertia of the condenser coil or the ambient air flow past the condenser coil. The control derives the required electric power from the solar cells when their output is sufficient, and otherwise draws the power from the batteries.

BRIEF DESCRIPTION OF THE DRAWINGS

Throughout the figures like reference numerals refer to like parts.

FIG. 1 is a perspective view of a chest-type refrigerating unit constructed in accordance with a first embodiment of the invention.

FIG. 2 is a simplified top plan view of the components of the refrigerating system contained within the bottom housing of the unit of FIG. 1.

FIG. 3 is an enlarged fragmentary vertical sectional view of the unit of FIG. 1.

FIG. 4 is an enlarged fragmentary vertical sectional view of the magnetically sealing gasket of the unit of FIG. 1. This view is an enlargement of the corresponding portion of FIG. 3.

FIG. 5 is a schematic diagram of the refrigerating circuit and control of the unit of FIG. 1.

FIG. 6 is a fragmentary vertical sectional view of an alternative form of the refrigerating unit constructed in accordance with a second embodiment of the invention.

FIG. 7 is a vertical sectional view taken along line 7—7 of FIG. 6.

FIG. 8 is an enlarged vertical elevational view illustrating an alternative damper construction for the unit of FIG. 7.

DESCRIPTION OF THE PREFERRED EMBODIMENT

Figure 9:
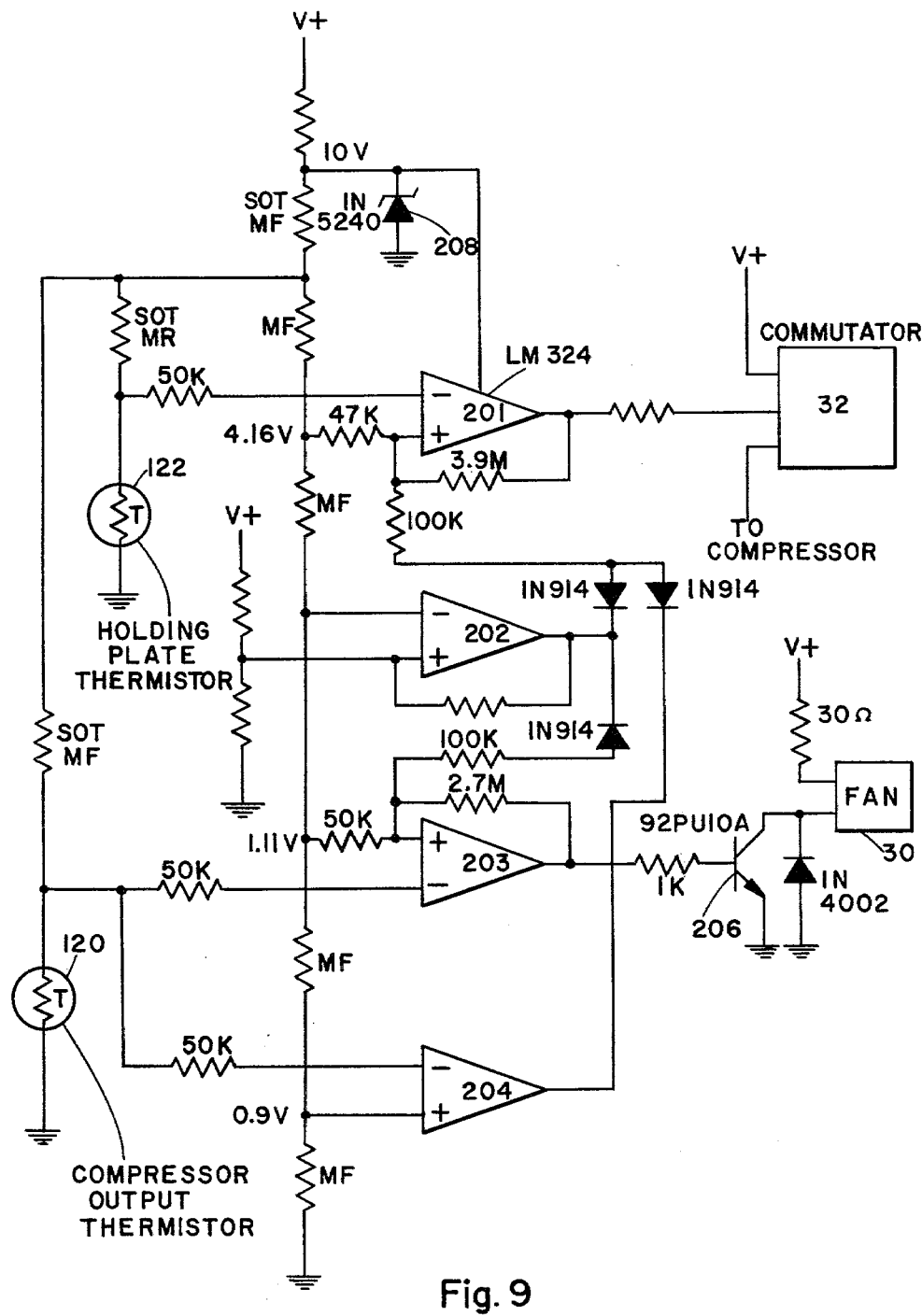
FIG. 9 is a schematic diagram of an electronic circuit which may be included in the system as a control.

Turning now to the drawings, a first embodiment of the present invention will be described in detail in conjunction with FIGS. 1-5. Referring to FIG. 1, there is illustrated therein a refrigerating unit designated generally by the reference numeral 10. The unit consists of a generally rectangular container 12 defining an upwardly opening compartment 14 and having a door 16 mounted thereon for opening and closing the compartment. The door is hingedly attached to the container by suitable surface mounted hinges not visible in FIG. 1. A brace 18 is pivotably secured to the underside of the door and may be swung out therefrom to prop the door in its open position as shown in FIG. 1.

A rectangular housing 20 (FIG. 3) is attached in supporting relationship beneath the container 12. The housing includes a horizontal base 22 made of waterproffed plywood. Supported on the horizontal base 22 (FIG. 2) mounted at the bottom of the housing 20 are various components of the refrigerant circuit including four batteries 24, a compressor 26, a condenser coil 28, a condenser fan 30, a commutator unit 32, and a control unit 34 which are hereafter described in greater detail. FIG. 2 is intended to be a simplified plan view of the components contained within the housing 20 and it does not illustrate certain details including the various wires which interconnect the different electrical devices and the refrigerant conduits which extend to and from the compressor and the condenser coil. The electrical components of the embodiment illustrated in FIGS. 1-5 may be powered by the battery, by solar cells, or from a conventional AC external power source connected thereto via a polarized plug 36.

The housing 20 preferably has screened openings such as 38 (FIG. 1) through its front and back walls which permit air to circulate therethrough by convection or through the aid of the fan 30. The unit 10 preferably has a manual latch 40 for permitting the door 16 to be locked into its closed position. Casters 42 are secured at four corners to the bottom surface of the base 22 and facilitate easy relocation of the unit 10.

The physical construction of the container 12, the door 16, and the housing 20 are illustrated in greater detail in the sectional views of FIGS. 3 and 4. As shown in FIG. 3, the container 12 includes spaced apart inner and outer shells 44 and 46 made of a moisture impervious material having a thermally insulating material 48 sealed therebetween. The shells 44 and 46 may be formed separately and may be sealed together along their abutting peripheral edges 50. Thereafter the insulation material may be placed between the shells and a bottom panel 52 also made of a moisture impervious material can be glued or otherwise sealed to the bottom peripheral edges of the outer shell 46. Preferably, the container 12 is integrally formed in the same fashion as a one piece molded bathtub. The preferred moisture impervious material is fiberglass reinforced plastic which may consist of an epoxy resin/glass fiber laminate. However, if the container 12 is too small to be readily molded out of fiberglass reinforced plastic, it may be vacuum formed from ABS or other suitable plastic material.

The one piece inner and outer shell unit 12 can be inverted and the space between the shells and beneath the bottom wall 54 can be filled with the thermally insulating material 48. This insulating material may be fluffed fiberglass or styrofoam, but it is preferably refrigeration grade polyurethane because of its very high thermal insulation value. The polyurethane can be poured into the one piece inverted container 12 and foamed in place. Thereafter, the bottom panel 52, which is preferably made of expanded polystyrene foam with a layer of fiberglass reinforced plastic on both sides, can be sealed to the lower peripheral edges of the outer shell 46 so that the insulation material is sealed within a moisture proof barrier on all sides. Preferably the insulation between the inner and outer shells 44 and 46, and between the bottom wall 54 and the bottom panel 52 is approximately 4 inches thick in order to minimize the amount of heat which is transferred from the outside ambient air through the container into the compartment 14.

It is important that the shells be made of a material that is impervious to moisture. It is further important that the bottom panel 52 be sealed in an airtight manner to the bottom peripheral edge of the outer shell 46 with epoxy or other suitable adhesive all the way around. The thermal insulation material 48 will retain its maximum insulating efficiency if moisture does not permeate therethrough. Furthermore, the refrigeration load can be minimized by preventing moisture laden ambient air from entering the compartment 14.

The door 16 (FIG. 3) is constructed in a similar fashion as the container 12 and includes inner and outer spaced apart shells 56, 58 made of a similar moisture impervious material such as fiberglass reinforced plastic or ABS plastic. A layer of thermally insulating material 60, preferably polyurethane foam which is approximately 3 inches thick, is disposed between the shells of the door which are sealed in an airtight manner around their peripheral edges.

The outer peripheral edges of the inner and outer shells 56 and 58 of the door (FIG. 3) preferably extend downwardly together in the shape of a vertical flange 62 which is received in a depressed region 64 extending around the upper periphery of the outer shell 46. A bumper 66 made of a resilient material such as vinyl, preferably overlaps the end of the flange 62. It is squeezed between the depressed region 46 of the outer shell of the container and the door when the door is closed to provide a substantially airtight seal and to prevent the entry or escape of air with respect to the refrigerated compartment 14.

The exterior surfaces of the container and the door are covered with an infrared radiation barrier 67 (FIG. 3). This barrier may take the form of an aluminized thin plastic film glued to the exterior surfaces of the outer shells 46 and 58 and the bottom panel 52. Preferably the film is aluminized MYLAR plastic film affixed with its reflective side facing out. This barrier reduces the amount of heat energy transmitted into the compartment in the form of infrared radiation from the sun and other sources.

The container and the door have opposing peripheral edge surfaces 68 and 70 which preferably are wide anough to produce a fairly long heat leak passage 72 which minimizes heat transfer therethrough. The medial portion 74 of the lower side of the door extends downwardly below the upper edge surface 68 of the container to provide a greater thickness of insulation in the portion of the door forming the upper wall of the refrigerated compartment 14.

Gasket means 76 (FIG. 3) extends around the opposing peripheral edge surfaces 68 and 70 of the container and the door. It helps to provide along with the bumper 66, a substantially air-tight seal between the door and the container when the door is closed. Details of the construction of the gasket means 76 are depicted in the enlarged view shown in FIG. 4. A gasket 78 (FIG. 4) is affixed to and extends around the peripheral edge surface of the door roughly intermediate the width of the vertical walls of the container. The gasket includes an upper annular ribbed portion 80 which is press fit into a semi-circular channel 82 formed in the inner shell 56 of the door. The intermediate portion of the gasket 78 has a plurality of horizontally extending vanes 84 formed therein for facilitating vertical expansion and contraction of the gasket. The lower portion of the gasket forms an outer casing 86 which encloses an inner strip-like core 88 made of a megnetized, ferrous impregnated material. Preferably, the gasket 78 is made of extruded polyvinyl and the core 88 is made of ferrous impregnated vinyl. A strip 90 (FIG. 4) made of a magnetically attractable metal, such as chrome is affixed to and extends around the peripheral edge surface 68 the walls of the container. The strip is directly beneath the gasket when the door is closed. It is positioned within a channel 92 formed in the junction 50 (FIG. 3) between the inner and outer shells 44 and 46 of the container 12.

The gasket means 76 is self sealing. In other words, when the door is closed, the magnetized core 88 is attracted to the strip 90 and the flexible gasket 78 is held tightly in abutting relationship with the strip all the way around the periphery of the container and the door. This provides a substantially airtight seal between the door and the container when the door is closed, in addition to the initial seal provided by the bumper 66.

As shown in FIG. 3, the compressor 26 is preferably mounted on resilient shock mounts 94 which are in turn secured to the base 22. This minimizes the amount of vibration which is transferred from the compressor during its operation to the container 12, thereby minimizing agitation of its contents and reducing noise output. Preferably the four batteries 24 are mounted at the corners of the base 22 as shown in FIG. 2. The batteries are maintained in position by rectangular wood frames 96 (FIG. 3) which are affixed to the upper surface of the base 22 and surround the lower side surfaces of the batteries. These frames are not depicted in FIG. 2.

The refrigerating unit 10 which is depicted in FIGS. 1-4 is intended for use in remote areas where electric power is not available. It is a top opening chest-type refrigerated storage container intended for medical supplies. For top opening chests of this type, the refrigeration load resulting from opening the door is less than that for side opening units. This is because the cool air inside is heavier than ambient air and will not rise upwardly when the door is opened. The container, door and battery housing are light-weight and strong and can withstand the abuses of transportation and use in remote areas. The refrigeration grade polyurethane foam insulation is preferably four inches thick on the sides and bottom of the container and three inches thick on the door in order to permit effective, efficient operation in areas of high ambient temperature.

The compartment 14 of the refrigerating unit 10 is subdivided into a freezer portion 14a and a cooler portion 14b (See FIG. 3). Approximately one-third of the volume of the compartment (portion 14a) is intended for the production of ice packs for use in THERMOS portable storage containers used to transport vaccines and medicines away from a central medical facility. The remaining portion 14b is used for the storage of medical supplies requiring refrigeration over an extended period of time. Eutectic solutions are used inside the compartment 14 as the cooling medium which permits the maintenance of constant temperatures over long periods of time with minimum energy consumption.

Turning now to a detailed discussion of the refrigerating circuit, a rectangular holding plate 98 and a rectangular insulating panel 100 subdivide the compartment within the container into the freezer portion 14a and the cooler portion 14b. The holding plate 98 (FIG. 3) includes a rectangular tank 102 preferably made of stainless steel panels joined by heliarc welding. While stainless steel is relatively expensive, it is desirable where the refrigerating unit is to be used for the storage of medicines since it can be readily sterilized and it will not rust or otherwise corrode.

A eutectic solution 104 (FIG. 3) is contained within the holding plate tank. Preferably the amount of eutectic solution contained within the holding plate tank is just sufficient so that when the solution is frozen it completely fills the tank. Thus, when the solution is in its liquid state its top surface 106 is substantially below the top wall of the tank to allow for expansion during freezing. The eutectic solution has a freezing point below 32° F. and preferably in the range of 25°±3° F. One suitable eutectic solution consists of a mixture of distilled water and propylene glycol in predetermined quantities. A refrigerant evaporator coil 108 (FIG. 3) extends within the holding plate tank 102 in serpentine fashion as illustrated in the schematic diagram of FIG. 5. The inlet end of the evaporator coil is coupled to the outlet end of the condenser coil 28 and the outlet end of the evaporator coil is connected to the input conduit of the compressor 26 as shown in FIG. 5. The inlet and outlet ends of the evaporator coil extend through the side wall of the tank, through the shells of the container, and into the housing. During periods of operation of the refrigerant circuit, a suitable liquid refrigerant such as Freon 12 expands within the evaporator coil 108 and cools the eutectic solution in the holding plate tank until the solution is frozen.

As shown in FIG. 3, both the holding plate 98 and the abutting insulating panel 100 are mounted on top of a raised portion 110 in the bottom wall 54 of the container. Both extend completely across the width of the compartment 14 and thus completely divide the compartment into the freezer and cooler portions 14a and 14b. Preferably the vertical height of the holding plate and the insulating panel are sufficient such that when the door is closed, the compartment portions 14a and 14b are connected only by a relatively small upper air passage 110. The surface of the holding plate tank which faces the cooler portion 14a is covered by the insulating panel 100. This panel may comprise a layer of polyurethane foam insulation 112 encased in fiberglass reinforced plastic 114.

The air within the freezer portion 14a of the compartment is directly in contact with the holding plate. Heat is thus extracted from the air within the freezer portion 14a via the holding plate until this compartment and the articles stored therein assume a temperature roughly equal to that of the eutectic solution 104. Preferably the temperature of the air within the freezer portion 14a is approximately 25°±3° F. On the other hand, the air within the compartment portion 14b is insulated from the holding plate by the insulating panel 100, except for the cool air that flows therein through the upper air passage 110 from the freezer portion 14a. The cooler portion 14b of the compartment is maintained at a temperature which is considerably above that of the air within the freezer portion 14a. Preferably the air temperature within the cooler portion 14b is approximately 40°±2° F.

The holding plate 98 must be selected to have dimensions in thickness, width and length to provide, in relationship to the freezer and cooler portions of the compartment 14, a fairly long duration of holding of the respective temperatures therein. Sufficient turns or legs of the evaporator coil 108 are provided within the holding plate tank in order to insure good transfer of heat to the coils from the eutectic solution within the tank. Where larger capacity is required, one or more walls of the compartment can be lined with additional holding plates.

The refrigerating circuit of the embodiment depicted in FIGS. 1-4 will now be described in greater detail by way of reference to FIG. 5.

The compressor 26, the condenser coil 28 and the evaporator coil 108 are interconnected with refrigerant conduits 116 in the conventional manner. Preferably the compressor is hermetically sealed within a casing to prevent damage that might otherwise result from refrigerant leaks in the compressor unit. The compressor unit should be light in weight and should consume a relatively low amount of electrical power when in operation. One suitable unit is the model BD 3 manufactured by Danfoss of Denmark. Preferably the compressor requires no more than 12 volts DC at approximately 5.5 amps nominal which is supplied to its electric motor through the commutator unit 32. The condenser coil 28 is of the air cooled type and preferably has a cooling capacity of approximately 800 BTU's per hour. Preferably the evaporator coil 108 is rated at approximately 1800 BTU's at approximately 15° F.

The unit 10 is capable of operating with electrical power supplied from either the batteries 24, a standard 120 volt AC external power source supplied through the polarized plug 36, or from an array of solar cells 118 mounted on top of a roof or some other supporting structure. The batteries 24 may be 12 volt DC automotive batteries. One suitable battery is the DELCO No. 1150. The solar cells 118 may be any high output photovoltaic cells. The array of solar cells must have an electrical power output, when exposed to direct sunlight, which is above the predetermined minimum level necessary to simultaneously operate the compressor 26 and the condenser fan 30. As solar cell technology has presently evolved, this will mean that the array 118 can be as little as 9 square feet in area. Preferably the solar cells are protected from damage resulting from back current spikes by a capacitor (not shown) of suitable value.

The refrigerating circuit of the unit 10 includes control means for insuring that the temperatures within the freezer and cooler portions of the compartment will be maintained within their optimum ranges utilizing a minimum amount of electrical energy. Specifically, the control 34 causes the compressor to operate only while the temperature of the eutectic solution is above a first predetermined temperature and for causing the condenser fan to operate only while the temperature of the refrigerant leaving the compressor is above a second predetermined temperature. Furthermore, the control is adapted for causing the electrical power necessary to operate the compressor and condenser fan to be drawn from the solar cells when their output is above the predetermined minimum level required for their operation. The control is further adapted for causing the electrical power necessary to operate the compressor and condenser fan to be drawn from the batteries when the electrical power output of the solar cells is below the required predetermined minimum level. In addition, during periods of non-operation of the compressor and the condenser fan, the control causes the batteries to be charged with available electrical power output from the solar cells. Where the control determines that external power is available through the plug 36, it will cause the compressor and the condenser fan to operate utilizing such available external power.

The objective of the control 34 is to minimize the amount of time that the compressor and the condenser fan must operate, it is necessary to very carefully monitor the temperature of the solution and the temperature of the refrigerant leaving the compressor. First thermostat means 120 (FIG. 5) are provided for sensing the temperature of the refrigerant in the output conduit of the compressor. Second thermostat means 122 are provided for sensing the temperature of the eutectic solution in the holding plate tank. Reasonably priced mechanical thermostats, e.g. the bi-metal type, usually are not capable of detecting temperature variations of less than 3° F. Therefore, the thermostat means 120 and 122 of the present invention preferably each comprise thermistors which are capable of detecting temperature variations of 2° F. or less. Preferably these thermistors are balanced, i.e. they incorporate compensating resistors to make their response linear. These thermistors are preferably attached to the output conduit of the compressor and to the holding plate tank with thermal cement. This permits them to accurately sense the temperatures of their respective, immediately adjacent fluids. The thermistors are interconnected with the control 34 through electric lines 124 and 126.

The control 34 preferably incorporates a solid state logic circuit which receives input signals from the solar cells, the batteries, the external power source plug, and the two thermistors. This logic circuit determines when to operate the compressor and the condenser fan 30 and where to derive the electrical power necessary to operate these devices to achieve the objectives of minimum operating time and maximum power conservation. This logic circuit may incorporate a general purpose microprocessor, and an operating program stored in a read only memory associated with the microprocessor. However, it is preferable for the logic circuit of the control 34 to be specially designed and to be miniaturized on a single chip. Microelectric control circuits which integrate readings from various sensors, and determine an optimum operating sequence or mode are well known. For example, the logic circuit of the control 34 of the present invention could be designed along the lines of CHRYSLER's engine-control monitoring network discussed in an article entitled "The Role of Microelectronics In Instrumentation And Control", by Bernard M. Oliver, printed on page 186 of the September, 1977 issue of "Scientific American".

The control 34 regulates the operation of the compressor 26 and the condenser fan 30 in the following fashion. When the thermistor 122 indicates that the temperature of the eutectic solution has risen to the first predetermined temperature, which is preferably approximately 2° F. above its freezing point, it turns the compressor on. This lowers the temperature of the eutectic solution. Preferably the compressor is run for the minimum amount of time that will result in the freezing of the eutectic solution. As soon as this is indicated by the thermistor 122, the control turns the compressor off. It is desirable to turn the compressor off as soon as possible after the eutectic solution freezes. Additional work of the compressor beyond this point will be wasted since it cannot be stored efficiently by the already frozen solution. It is desirable to turn the compressor on before the temperature of the solution rises too far above its freezing point. Generally speaking, less energy is utilized in maintaining a specific compartment temperature over a given time period by a succession of short, small step temperature reductions, rather than by a single long, large step temperature reduction.

During periods of operation of the compressor 26, the thermistor 120 (FIG. 5) tells the control 34 how hot the refrigerant leaving the compressor is. When the compressor 26 is first started it is unnecessary to operate the condenser fan. This is because the heat in the refrigerant leaving the compressor can be dissipated as a result of the thermal inertia of the cool metal in the condenser coil 28. It is also dissipated by ambient air flowing by convention through the screened openings 38 (FIG. 1) and past the condenser coil. However, once the temperature of the refrigerant leaving the compressor rises above the second predetermined temperature, it is necessary to assist the cooling of the refrigerant in the condenser coils by operating the condenser fan. Thus, when the thermistor 120 senses that the refrigerant leaving the compressor has risen above this predetermined temperature it runs the fan. Furthermore, as soon as the thermistor 120 indicates that the temperature of the liquid refrigerant leaving the compressor has dropped below this predetermined temperature, it turns the condenser fan off. In some instances where only a minimum amount of heat is being removed from the compressor, the movement of ambient air past the condenser coil will be sufficient to produce the required heat exchange and thus the condenser fan will not operate at all. Thus by operating the condenser fan only when necessary electrical power stored in the batteries may be conserved. Furthermore, should the condenser fan 30 fail, when the thermistor 120 indicates that the temperature of the refrigerant is above the first predetermined temperature, it will turn the compressor off. This will allow electrical power to be saved until the fan can be repaired or replaced.

The refrigerating unit described above has a long duration cold capacity because of its physical construction. It is capable of maintaining the desired compartment temperatures with a daily run of four hours on and 20 hours off. This results in minimum battery drain. The unit can be constructed so that maximum power consumption from light usage is approximately 15 to 20 amp hours per day and approximately 30 amp hours per day for normal usage. The unit can be run directly from solar cells. Furthermore, the control 34 can be designed so that the compressor and condenser will operate for extended periods of time during peak sunshine hours.

FIGS. 6–8 depict an alternative refrigerating unit 130 which incorporates the same structure set forth above except where otherwise indicated. It may utilize a similar control system. A principal distinction between the refrigerating unit 130 and the refrigerating unit 10 are that the former has a housing 132 at one end which contains most of the refrigerating circuit components. In addition the unit 130 has a single cooling compartment 134 which is held at a uniform temperature typically above 32° F. The housing 132 has a hinged panel 136 for allowing access to the components of the refrigerating circuit. The compartment 134 has an elongated, generally rectangular configuration including two end walls, two side walls, and a bottom wall. The compartment opens upwardly and may be closed and opened via the door 16. The rectangular holding plate is attached in overlapping relationship with the end wall 138 closest to the housing 132. Portions of the inlet and outlet conduits 139 of the evaporator coil are depicted in FIG. 7.

As best seen in FIG. 7, the housing plate tank 132 of the unit 130 is sized so that its edges are spaced from the side walls and the bottom wall of the compartment and from the door when the door is closed. The surface of the holding plate tank facing the other end wall of the compartment (not shown) is covered by the insulating panel 100 which subdivides the compartment. The insulating panel 100 contacts the side walls and the bottom wall of the compartment 134 as shown in FIG. 7. The panel is shaped so that a small upper air passage 140 extend therethrough. Air circulates by convection through the upper air passage 140, down the vertical air passages defined between the sides of the holding plate tank 102 and the side walls of the compartment, and through the lower air passage 142. This is shown by the arrows in FIGS. 6 and 7. A manually moveable damper 144, which may comprise a moveable plastic flap, may be moved to cover or uncover different portions of the lower air passage 142. This regulates the amount of cold air introduced into the compartment 144, which controls its temperature with respect to that of the holding plate. The damper panel 144 can be replaced with a flap which opens and closes the lower air passage 142 in response to the switching of a bi-metal thermostat.

As an alternative to the damper means just described, a continually varying damper can be provided to automatically adjust the air flow to more uniformly maintain the preferred compartment temperature.

Aspiral, bi-metal spring 146 (FIG. 8) can be secured to the insulating panel 100 with a central screw 148. An arcuate shaped covering panel 150 can be secured by means of a screw 152 to the free end of the spring 146. A relatively small arcuate shaped lower air passage 154 can be formed in the insulating panel 100 in alignment with the path of rotation of the covering panel. Changes in the temperature of the air within the compartment 134 will result in continuous adjustment of the size of the lower air passage as the spring expands and contracts to move the panel 150 over greater or lesser portions of the passage 154. A protective cover can be placed over the continuous damper means to protect its operation from articles stored in the compartment 134. This cover is shown in FIG. 8 as a square 156 outlined in phantom lines.

FIG. 9 shows a schematic diagram of an electronic circuit which can be utilized as the control 34. This circuit is designed to receive electric power (V+) only from solar cells. The circuit includes four, independent, high gain, internally frequency compensated operational amplifiers 201-204. They are designed to operate from a single power supply over a wide range of voltages. Low power quad operational amplifiers of this type are commercially available in single package form. One such suitable package is the LM324 of National Semiconductor Corporation, 2900 Semiconductor Drive, Santa Clara, Calif. 95051.

In the circuit shown, the op amps 201-204 are interconnected with the thermistors 120 and 122, with the electric power (V+) from the solar cells 118, and with the compressor 26 and the condenser fan 30 to perform the switching functions necessary to conserve power and permit operation under a wide range of solar conditions.

The second op amp 202 determines whether the voltage output V+ from the solar cells is high enough, but not too high, to operate the compressor and condenser fan. Damage to the commutator and other circuit components may result if the voltage V+ is too great. When V+ is between approximately 10.5 and 14.5 volts DC the op amp 202 sends signals to the first and third op amps 201 and 203. These signals permit these latter op amps to be biased on or off by the impedences of the holding plate thermistor 122 and the compressor output thermistor 120, respectively.

The output of the first op amp 201 is connected to the commutator 32 which in turn is operatively connected to the compressor and the output voltage V+. Thus when the output voltage of the solar cells is in the proper range, the thermistor 122 connected to the input of the first op amp 201 will switch the compressor on and off. By choosing the appropriate thermistor 122 the compressor can be made to operate for the minimum period required to freeze the eutectic solution and to switch on when the temperature of such solution rises only a few degrees above its freezing point.

The output of the third op amp 203 biases an NPN bipolar junction transistor 206 to switch the condenser fan 30 on and off. The thermistor 120 connected to the input of the third op amp 203 will switch the fan 30 on and off according to the temperature of the refrigerant in the compressor output. The voltage V+ must be in the proper range before the fan 30 can be switched on. By choosing the appropriate thermistor 120 the fan can be made to operate when the refrigerant in the compressor output is between approximately 110° F. and 120° F.

When the refrigerant is too hot, e.g. above 130° F. as indicated by the thermistor 120, its impedance will bias the fourth op amp 204 so that its output will bias the op amps 201 and 203 off. This will in turn shut down the compressor and fan and prevent damage to the system. Thus, a safety override is provided. When, for example, the screened openings 38 are blocked, air circulation may be prevented, and the override will prevent system over heating.

Where indicated with an MF in FIG. 9, metal film resistors are used. Their resistance is substantially unvarying with temperature changes. A zener diode 208 stabilizes the voltage to the op amps.

Having described preferred embodiments of my invention, it should be apparent to those skilled in the art that the invention permits a modification in both arrangement and detail. For example, the control could be designed to utilize whatever power is available from the solar cells for powering the compressor and the condenser fan, and to make up the difference from the batteries. Therefore, my invention should be limited only in accordance with the scope of the following claims.

I claim:

1. A refrigerating system comprising:
    a thermally insulated storage container having an interior compartment;
    a refrigerant circuit for cooling the interior compartment of the storage container when energized with a predetermined minimum level of electric power, including a refrigerant compressor for delivering compressed refrigerant, a condensor for receiving the compressed refrigerant and delivering it to an evaporator coil, and a fan for circulating air past the condenser;
    a holding plate tank mounted in the interior compartment of the storage container and housing the evaporator coil;
    a quantity of a eutectic solution within the tank having a freezing point below 32° F.;
    a plurality of batteries for providing the predetermined minimum level of electric power when sufficiently charged;
    an array of solar cells having an output which is above the predetermined minimum level of power when exposed to a sufficient intensity of solar radiation; and
    control means interconnected with the refrigerant circuit, the batteries and the solar cells for causing the refrigerant circuit to be powered by the solar cells when their output is above the predetermined minimum level of power, and for causing the refrigerant circuit to be powered by the batteries when the output of the solar cells is below the predetermined minimum level of power, the control means including first thermostat means for causing the refrigerant circuit to operate only so long as the temperature of the eutectic solution is above a first predetermined temperature, and second thermostat means for causing the fan to operate only when the temperature of the refrigerant delivered by the compressor is above a second predetermined temperature.

2. A high efficiency refrigerating system for maintaining food or medicines at low temperatures for long durations of non-operation, comprising:
    a container defining a compartment having an opening and a door mounted on the container for opening and closing the compartment, the container and door each including spaced apart inner and outer shells made of a moisture impervious material having a thermally insulating material sealed therebetween;
    a holding plate disposed within the compartment including a tank, a quantity of a eutectic solution within the tank having a freezing point below 32° F., and a refrigerant evaporator coil disposed within the tank and immersed within the eutectic solution;
    a refrigerant circuit including the evaporator coil for cooling the eutectic solution, the refrigerant circuit including an electrically powered refrigerant compressor having an input conduit coupled to an output end of the evaporator coil and an output conduit, a condensor including a coil having an inlet end coupled to the output conduit of the compressor and an outlet end coupled to an input end of the evaporator coil, and an electrically powered fan for circulating air past the condensor coil, first thermostat means for sensing the temperature of the refrigerant in the output conduit of the compressor, and second thermostat means for sensing the temperature of the eutectic solution in the holding plate;

an array of solar cells having an output when exposed to a sufficient intensity of solar radiation which is above a predetermined minimum level necessary to power the compressor and condensor fan; and control means interconnected with the refrigerant circuit and the solar cells for detecting when the output of the solar cells is above the predetermined minimum level, and for thereafter causing the compressor to be powered by the output of the solar cells only while the temperature of the eutectic solution is above a first predetermined temperature and for causing the condensor fan to be powered by the output of the solar cells only while the temperature of the refrigerant leaving the compressor is above a second predetermined temperature.

* * * * *